June 18, 1968   R. A. MacDONALD   3,388,966
AMMONIUM PHOSPHATE PREPARATION
Filed Feb. 10, 1964
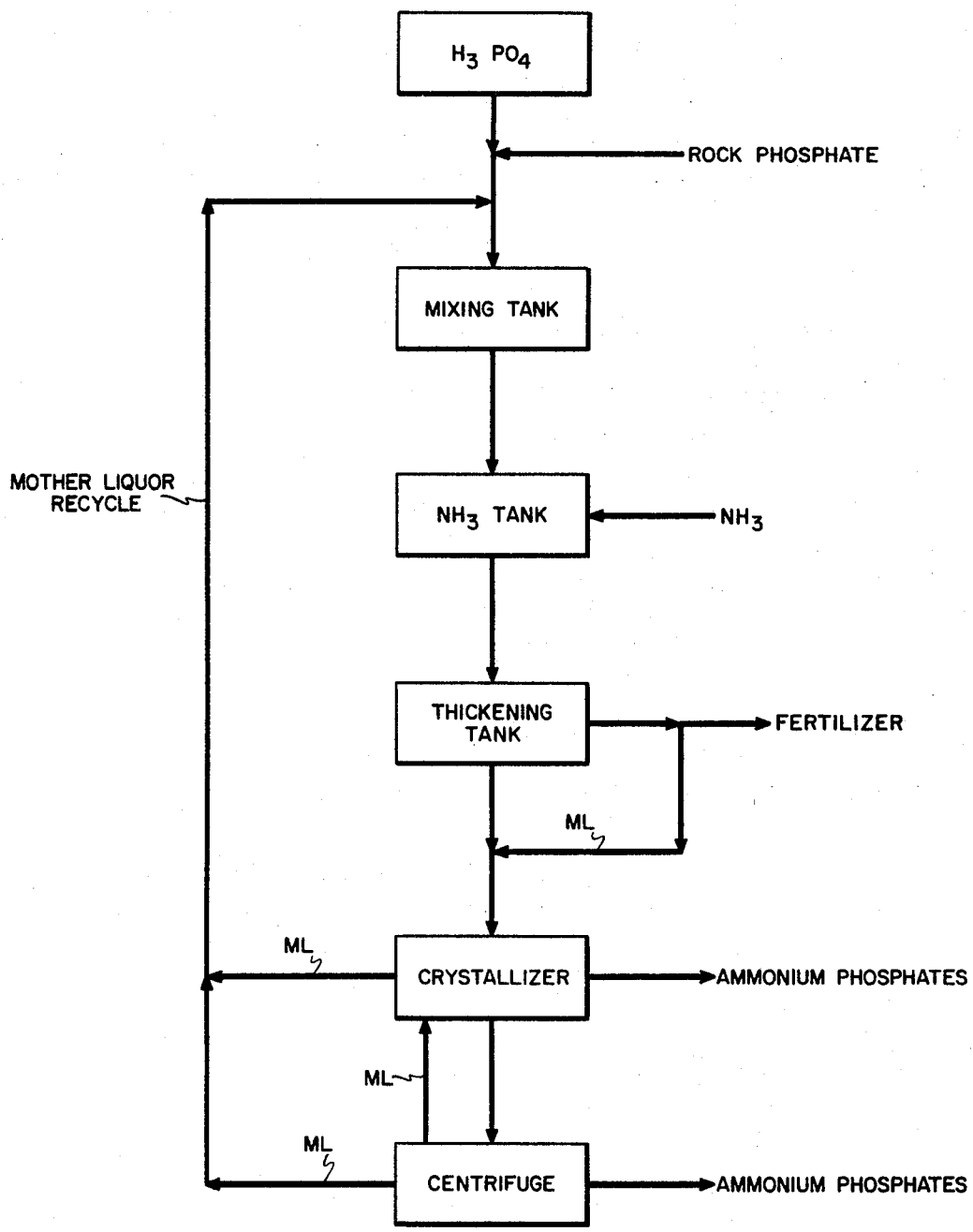
Robert A. MacDonald   INVENTOR
BY David A. Roth
PATENT ATTORNEY United States Patent Office 3,388,966
Patented June 18, 1968

3,388,966
AMMONIUM PHOSPHATE PREPARATION
Robert A. MacDonald, 27 Pilgrim Drive,
Port Chester, N.Y. 10573
Filed Feb. 10, 1964, Ser. No. 343,649
8 Claims. (Cl. 23—107)

ABSTRACT OF THE DISCLOSURE

This disclosure relates to processes for the preparation of ammonium phosphates, such as, e.g., monoammonium phosphate and diammonium phosphate, by reacting a relatively impure phosphoric acid, such as, e.g., wet-process phosphoric acid, with a source of ionizable calcium, such as, e.g., phosphate rock, and a recycle mother liquor comprising fluoride and sulfate ions—preferably separating calcium sulfate and calcium fluoride from the reaction mixture—; ammoniating the resulting reaction mixture to form insoluble compounds therein; separating the insoluble compounds from the reaction mixture; crystallizing ammonium phosphate product from the resulting liquor short of the liquor concentration where appreciable fluoride and sulfate ions are coprecipitated with the ammonium phosphate product; and, preferably, recycling the mother liquor. The ammonium phosphates formed are especially useful as intermediates in the preparation of other phosphates, used as fertilizers.

---

This invention relates to processes for the preparation of pure ammonium phosphates. In particular, it relates to processes for the preparation of pure ammonium phosphates which are suitable intermediates for the production of various phosphates and polyphosphates useful in industry. It especially relates to a process for producing high purity ammonium phosphates as well as side products which are useful as fertilizers.

A conventional method of preparing ammonium phosphates is to neutralize crude phosphoric acid such as wet process phosphoric acid with ammonia in order to crystallize insoluble salts of undesirable ions out of solution, remove such solidified products, and subsequently crystallize out an ammonium phosphate which is relatively free of impurities such as iron and aluminum. However, while ions which are impurities such as iron and aluminum are relatively easy to remove because they readily form insoluble phosphate compounds, upon ammoniation of the acid to pH's of 3 or greater, there are other ions such as fluorides and sulfates which remain in solution and tend to precipitate out with the ammonium phosphates upon concentration of the liquor. These ions contaminate the ammonium phosphates to such an extent that their use as intermediates to make pure phosphate compounds for the nonfertilizer industrial uses have been severely limited. The problem has been overcome by using electric furnace phosphoric acid, but this is much more expensive than wet process phosphoric acid.

A technique has been discovered which forms the substance of this invention for producing relatively pure ammonium phosphates for use as fertilizers, and as intermediates for industrial phosphate compounds. A by-product solid, containing phosphate, nitrogen, calcium and sulfates, is also produced which is valuable as a fertilizer.

In brief, a preferred version of the invention comprises reacting wet process, phosphoric acid, most preferably with recycle mother liquor from a previous processing step, with a source of calcium ion such as calcium carbonate or, preferably, finely divided rock phosphate.

In one embodiment of this invention, there is provided a method for preparing ammonium phosphates comprising the steps of:

(a) reacting, at temperatures of between about 120 and about 220° F., wet process phosphoric acid with a calcium-containing material that is substantially free of fluoride and sulfate ions and capable of providing calcium ions in stoichiometric amounts relative to the amounts of fluoride ions and sulfate ions contained in said phosphoric acid;

(b) ammoniating the resulting mixture at temperatures of between about 180 and about 260° F. to a pH of at least 4 to form insoluble compounds in the reaction mixture;

(c) separating the insoluble compounds from the reaction mixture;

(d) crystallizing a solid ammonium phosphate phase from the resulting liquor short of the liquor concentration where appreciable sulfate and fluoride ions are coprecipitated wth said ammonium phosphate phase;

(e) recovering said ammonium phosphate phase from said liquor; and (f) recycling the mother liquor from step (e) comprising fluoride ions and sulfate ions back to step (a).

In an alternative, and more preferred, embodiment of this invention, there is further provided a method of preparing ammonium phosphates comprising the steps of:

(a) reacting, at temperatures of from about 120 to about 220° F., wet process phosphoric acid with (1) recycle mother liquor comprising fluoride ions and sulfate ions, and (2) a calcium containing material that is substantially free of fluoride ions and sulfate ions and contains calcium ions in amount stoichiometric to the amount of fluoride ions and sulfide ions contained in said reaction stage;

(b) ammoniating, at temperatures of from about 180 to about 260° F., the resulting mixture to a pH of from about 4 to 7 to form insoluble compounds in the reaction mixture;

(c) separating the insoluble compounds from the reaction mixture;

(d) crystallizing a solid ammonium phosphate phase from the resulting liquor short of the liquor concentration where appreciable sulfate ions and fluoride ions are coprecipitated with the ammonium phosphate phase;

(e) recovering said ammonium phosphate phase; and (f) recycling the mother liquor from the crystallization step of (d) back to the reaction step (a).

The proportion of constituents is adjusted to cause the formation of compounds of calcium fluoride and calcium sulfate while minimizing formation of compounds of calcium and phosphorus.

The reaction slurry is next advanced to an ammoniation stage which is carefully regulated in temperature and pH to cause the formation of iron and aluminum phosphate compounds as relatively large, rapidly settling particles. This reaction mixture is then separated into two components, (1) a clarified liquid, and (2) a solid phase with adhering mother liquor. This separation can be accomplished, (1) by settling and decantation, (2) by filtration, (3) by combination of (1) and (2), (4) by centrifugation, or (5) by any other commonly used method of separating an unstable solid liquid suspension. The solid phase component is then formed into a fertilizer by appropriate processing while the clarified liquor is advanced to an evaporation-crystallization stage.

The evaporation-crystallization stage is used to remove water, and in so doing, causes the formation of ammonium phosphate crystals. This can be done in multiple stage units in a manner which will enable the countercurrent movement of crystals and mother liquor such that the product crystals will be removed from the feed crystallizer, where the impurities are at the lowest concentration. The concentration of soluble impurities is controlled to a point short of the phase boundaries (solubility) of solid phase $F^-$ and $SO_4^{--}$ salts such as $(NH_4)F_2$ and $(NH_4)_2SO_4$, at which point the liquor is separated and returned to the first operation which comprises reacting of a calcium source with wet process acid.

Modifications are possible in operation to permit handling of suspended calcium salts in the feed liquor to the crystallizers. Calcium entering in the feed will have a tendency to form solid phase dicalcium phosphate. When this happens crystal contamination can be minimized by causing the formation of small sized particles of dicalcium. Such crystals will always be minute in comparison to ammonium phosphate crystals and can be readily separated by elutriation prior to product-liquor separation.

It has been found that the basic process as described above can be quite substantially improved by recycle of the mother liquor left over after crystallization of the ammonium phosphates and after centrifuging. The mother liquor from the centrifuge can either be recycled back to the crystallizer or, if desired, recycled back to the acidulation reactor. The main body of mother liquor from the crystallizer can also be recycled back to the acidulation reactor. This mother liquor contains some uncrystallized ammonium phosphates which are thus reintroduced to the overall process. The mother liquor also contains calcium ions which, when recycled back to the process, are available to back out certain quantities of sulfate ions. It is most important that the solubility of $(NH_4)F_2$ and $(NH_4)SO_4$ in the evaporator not be exceeded of optimum purity is to be obtained.

The use of recycle as described above is a preferred mode of operation and generally will produce the purest product in a most economic manner. However, it is to be understood that the main process as described without recycle can also be used to produce a relatively pure ammonium phosphate product which is quite satisfactory for many uses.

The invention is particularly adapted for use with wet process phosphoric acids, since it is the least expensive phosphoric acid and ordinarily would not be considered suitable for a process of this nature because of the many impurities contained therein. Thus, it is one of the significant advantages of the present invention that very impure phosphoric acid can be used to successfully produce pure ammonium phophates as well as a by-product useful as a fertilizer.

Although the pure ammonium phosphates produced by the process of the invention can be used as fertilizers themselves, they will ordinarily be of such purity that it may be preferable to use them as intermediates to produce commercial phosphates.

As an example of the use of the pure ammonium phosphate the following reactions are given.

$$3NH_4H_2PO_4 + 5NaOH \longrightarrow 3NH_3\uparrow + 7H_2O + Na_5P_3O_{10}$$
Sodium Tripolyphosphate $$NH_4H_2PO_4 + 2NaOH \longrightarrow NH_3\uparrow + 2H_2O + Na_2HPO_4$$
Disodium Phosphate $$NH_4H_2PO_4 + KCl \xrightarrow{\Delta} NH_4Cl\uparrow + KH_2PO_4$$
Monopotassium Phosphate $$NH_4H_2PO_4 + Ca(OH) \longrightarrow CaHPO_4 + NH_3\uparrow + 2H_2O$$
Dicalcium Phosphate It can be seen from these reactions that very pure sodium tripolyphosphate, disodium phosphate, monopotassium phosphate and dicalcium phosphate can easily be produced.

These materials have a considerable market as can be seen from Table I which follows:

TABLE I.—CONSUMPTION OF PHOSPHOROUS COMPOUNDS U.S. 1958

| Material: | Tons of elemental phosphorus equivalent |
|---|---|
| Dicalcium phosphate | 45,000 |
| Trisodium phosphate | 9,200 |
| Sodium tripolyphosphate | 112,000 |
| Tetrasodium pyrophosphate | 16,000 |
| Monocalcium phosphate | 7,500 |
| Total nonfertilizer mineral phosphates | 267,000 |

In general, the following table represents preferred, particularly preferred, and especially preferred operating ranges.

| | Operating Conditions | | |
|---|---|---|---|
| | Preferred | Especially Preferred | Most Preferred |
| Temperature, °F.: | | | |
| Phosphoric Acid reaction with Ca source | 120–220 | 120–190 | 120–160 |
| Ammoniation | 180–260 | 210–230 | 215–220 |
| Crystallization of ammonium phosphate | 120–260 | 190–230 | 200–210 |
| Centrifuging of ammonium phosphate | 120–260 | 120–210 | 120–190 |
| Recycle of mother liquid | 120–260 | 120–210 | 120–190 |
| Pressures: | | | |
| For entire process except crystallization, atmos | 1 | 1 | 1 |
| Crystallization of ammonium phosphate, atmosphere | 0.001–1.0 | 0.001–1.0 | 0.001–1.0 |
| pH of— | | | |
| Phosphoric acid reaction with Ca source | 0–2 | 0–2 | 0–2 |
| Ammoniation | 3–8 | 4–7 | 4 or 7 |
| Precipitation of fertilizer side product | 1–5 | 2–4 | 2–4 |
| Crystallization of ammonium phosphate | 3–8 | 4–7 | 4–7 |
| Centrifuging of $NH_3$ phosphate | 3–8 | 4–7 | 4–7 |
| Recycle of mother liquid | 3–8 | 4–7 | 4–7 |
| Mole Ratios of Ionic Reactants: | | | |
| Ca#/F⁻ | 0.50–5.0 | 0.5–1.0 | 0.5–0.6 |
| Ca#/SO₄⁻⁻ | 1.0–10.0 | 1.0–5.0 | 1.0–5.0 |
| $NH_3/H_3PO_4$ | 0.3–2.0 | 0.5–2.0 | 1.0 |
| Other Process Variables: | | | |
| Rate of Addition of Ca in moles/hr./mole of $P_2O_5$ | 0.3–0.6 | 0.4–0.5 | 0.4–0.5 |
| Rate of Ammoniation in moles/hr./mole of $P_2O_5$ | 1.0–3.0 | 2.0–3.0 | 2.0–2.5 |
| Filtering, rate of fertilizer by-product, gals. slurry per hr. x ft.² | 100–1,000 | 400–600 | 500–550 |
| Recycle of mother liquid (ML) vol. of ML/vol. of $H_3PO_4$ | 0.3–0.6 | 0.4–0.6 | 0.4–0.5 |

The invention is further illustrated by the following process description taken in connection with the drawing which is contemplated to be the best mode of carrying out the invention. Crude (wet process) phosphoric acid and phosphate rock are introduced into the mixing tank along with a stream of recycle mother liquor from the crystallizer. Solids formed in this step within the mixing tank can be separated or can also remain with the liquor for clarification after the ammoniation reaction.

The liquid material from the mixing tank is transferred to the ammonia tank where ammoniation takes place. Preferably this is performed in such a manner that large crystals are formed which permits rapid settling of these solids to obtain a polished liquor. During the course of these reactions the sulfate and fluoride concentrations will be substantially reduced in the liquor and the aluminum and iron ions will be essentially eliminated.

The reaction mixture is next conveyed to a thickening tank where the insolubles formed are removed by clarification, preferably by filtration or both to recover the mother liquor which clings to the solid materials.

The mother liquor is then conveyed to the crystallizer. During crystallization solid phase ammonium phosphate is formed. The impurities, which are at this point primarily residual sulfates and fluorides, concentrate in the mother liquor. Evaporation and crystallization is continued to a point just short of the solubility limit of that impurity ion most likely to form the second solid phase (or new solid phase) such as $NH_4F_2$ or $(NH_4)_2SO_4$.

In this portion of the process, a series of crystallizers would probably be used to permit operating somewhat away from the solubility phase boundaries up until the final concentration, even though the diagram for purposes of simplicity, shows only one crystallizer.

The ammonium phosphate crystals can be further separated from the mother liquor by centrifuging, washing, repulping, and again centrifuging.

The crystals of ammonium phosphate which are recovered are of a high purity and contain only the mother liquor as a contaminant. The mother liquid contaminant can be removed by chemical reactions or another fractional crystallization step.

This particular step in the process is not critical and can be established as best adapted to particular plant layout, products, and specifications. For example, during the initial crystallization, crystals can be extracted from the liquor of the final stage and washed with feed liquor; then they can be repulped in a relatively pure liquor to yield improved purity.

The mother liquor from the crystallizer and centrifuge steps which is richer in sulfates and fluorides than the crystals can either be recycled to the acidulation reaction with the phosphate rock, or it can be introduced into the reactor where the phosphoric acid is formed.

In any event, the mother liquid acid values are utilized in the extraction of more phosphate rock.

This ammonium phosphate process can be easily modified to produce diammonium or monoammonium phosphate as desired depending on the desired economics or product purity.

A process material balance for this process is set forth in Table II which follows.

This has a twofold effect: Either the yield of ammonium phosphate is reduced or the product is contaminated.

Secondly, if the liquor is rejected at the phase boundaries of these contaminants, it must either be purified or used as lower value products. The process of the invention shows a method of adding phosphate rock to lower the concentrations of fluorides and sulfates and returning these liquors. Thus crude rock phosphate is made available by the contaminants (F and $SO_4$) which, among other things, is a significant economic factor. The recycle liquor is now available for further concentration and need not be rejected for fertilizer use. Consequently, the crystallized feed liquor is relatively pure.

The invention is further illustrated by the following examples.

EXAMPLE 1

The process was demonstrated on a small scale using the approximate feed materials, quantities and compositions shown on page 11 of this application.

Wet-process phosphoric acid and recycle mother liquor were mixed with finely ground phosphate rock at an elevated temperature. The slurry was agitated for a time to permit reaction and the acids were then neutralized with ammonia under conditions such that a pH–4 was maintained. The reaction temperature was near the boiling point.

The neutralized slurry was then filtered and the cake washed, visually, free of crystals. The liquor was then concentrated, during which time crystals formed, to the extent indicated by the material balance on page 11.

This slurry was then filtered and the filter cake and mother liquor chemically analyzed. The compositions shown on page 15 list these compositions.

The mother liquor analysis as the result of this example was as follows in Table III.

TABLE II. PROCESS MATERIAL BALANCE

| Step | $NH_3$ | $P_2O_5$ | $SO_3$ | F | CaO | $Fe_2O_3$ | $Al_2O_3$ | $H_2O$ | Total |
|---|---|---|---|---|---|---|---|---|---|
| Mixing Tank: | | | | | | | | | |
| Acid Feed | | 100.00 | 6.35 | 7.30 | 1.27 | 2.64 | 2.54 | 155.56 | 317.46 |
| Recycle | 11.42 | 32.87 | 4.50 | 3.01 | .02 | .05 | .08 | 55.10 | 120.40 |
| Phosphate Rock | | 12.05 | .24 | 1.31 | 17.27 | .50 | .39 | 1.05 | 35.00 |
| Total | 11.42 | 144.92 | 11.09 | 11.62 | 18.56 | 3.19 | 3.01 | 211.71 | 472.86 |
| Percent Comp | 2.41 | 30.64 | 2.34 | 2.46 | 3.92 | .67 | .64 | 44.76 | |
| Add $H^2O$ | | | | | | | | 74.00 | 74.00 |
| Total | 11.42 | 144.92 | 11.09 | 11.62 | 18.56 | 3.19 | 3.01 | 285.71 | 546.86 |
| $NH_3$ Tank: | | | | | | | | | |
| Add $NH_3$ | 25.43 | | | | | | | | 25.43 |
| Total | 36.85 | 144.92 | 11.09 | 11.62 | 18.56 | 3.19 | 3.01 | 285.71 | 572.29 |
| Solid φ | | 6.78 | 3.97 | 10.46 | 18.19 | 3.10 | 2.89 | | 41.36 |
| Liquid φ | 36.85 | 138.14 | 7.12 | 1.16 | 0.37 | 0.09 | .12 | 285.71 | 530.93 |
| Clarifier, U'Flow: | | | | | | | | | |
| Solid | | 6.78 | 3.97 | 10.46 | 18.19 | 3.10 | 2.89 | | 41.36 |
| Liquid | 7.63 | 28.59 | 1.47 | .24 | .08 | .02 | .02 | 59.14 | 109.90 |
| Total (fertilizer feed) | 7.63 | 35.37 | 5.44 | 10.70 | 18.27 | 3.12 | 2.91 | 59.14 | 151.26 |
| Percent Comp. (Liq.) | 6.94 | 26.01 | 1.34 | .22 | .07 | .02 | .02 | 53.81 | |
| Crystallizer: | | | | | | | | | |
| Feed | 29.22 | 109.55 | 5.65 | .92 | .29 | 0.07 | 0.10 | 226.57 | 421.03 |
| Evaporate ($H_2O$) | | | | | | | | 177.58 | 177.58 |
| Total Slurry | 29.22 | 109.55 | 5.65 | 0.92 | .29 | 0.07 | 0.10 | 226.57 | 243.45 |
| Solid φ | 18.39 | 76.68 | | | | | | | 124.23 |
| Percent Comp | 14.8 | 61.72 | | | | 51.03 | Solids | | |
| Liquid φ | 10.83 | 32.87 | 5.65 | .92 | .29 | 0.07 | 0.10 | 48.99 | 119.22 |
| Percent Comp | 9.08 | 27.57 | 4.74 | .77 | .24 | 0.06 | 0.08 | 41.09 | 100.00 |

In essence, the invention involves the following. Ammonium phosphates are crystallized from solutions which are low in impurities. In prior art processes, the feed wet process phosphoric acid contains major amounts of impurities which are comprised of ions such as iron and aluminum, which form insoluble compounds, and the ions, fluoride and sulfate, which remain in solution. The insoluble substances can be removed by simple neutralization of the phosphoric acid. But when this is done, fluorides and sulfates remain as major contaminants which form solid phases at relatively low ratios of concentration.

TABLE III.—LIQUOR ANALYSIS

| Material: | Percent |
|---|---|
| $H_2O$ | 59.80 |
| $P_2O_5$ | 22.30 |
| $NH_3$ | 6.35 |
| Ca | 0.03 |
| $SO_4$ | 3.14 |
| F | 0.16 |

The analysis of the ammonium phosphate which was obtained was as follows in Table IV.

TABLE IV.—CAKE (SOLID PHASE) OF
AMMONIUM PHOSPHATE

| Material: | Percent |
| --- | --- |
| $H_2O$ | ---- |
| $P_2O_5$ | 61.32 |
| $NH_3$ | 14.44 |
| Ca | 0.57 |
| $SO_4$ | 0.25 |
| F | 0.03 |

EXAMPLE 2

The procedure of this example was as follows:

To 600 grams of wet process phosphoric acid having an average concentration of 2–3% fluoride ion, 0.3–0.5 iron ion and 0.2–0.4 aluminum ion were added 200 grams of water and 60 grams of Florida phosphate rock. A typical phosphate rock analysis is: $P_2O_5$, 32.6%; F, 3.8%; $Fe_2O_3$, 1.4%; $Al_2O_3$, 1.8%; CaO, 47.3%; $H_2O$ and insolubles, 6.5%. These were stirred for thirty minutes at room temperature (25° C.).

To this acid rock mixture, sufficient ammonium hydroxide was added to bring the pH up to 4.0. The slurry was filtered and both the precipitate and the filtrate were recovered. The precipitate was dried and analyzed. The results are as follows in Table V.

TABLE V

| | Percent |
| --- | --- |
| Nitrogen | 7.13 |
| $P_2O_5$ | 34.24 |
| Ca | 17.4 |
| Fe | 2.6 |
| Al | 1.6 |

This by-product material would be sold as a fertilizer.

The filtrate was concentrated by evaporating to form a slurry which was filtered to separate the monoammonium phosphate crystals. The crystals were washed with a small amount of water to remove all traces of the mother liquor.

The monoammonium phosphate crystals were then redissolved in distilled water. This liquor was then concentrated by heating and filtered to remove the crystals. The crystals were then dried and analyzed. The analysis of the crystals was as follows in Table VI.

TABLE VI

| | Percent |
| --- | --- |
| $NH_4H_2PO_4$ | 96.9 |
| Ca | 2.05 |
| Fe | 0.42 |
| Al | 0.42 |
| F | 0.21 |
| | [1] 100.00 |

[1] On a dry basis.

As can be seen from the above Table VI, the concentration of Fe, Al, and F ions in the final product has been drastically reduced.

If desired, the step involving the redissolving of the crystals in water could be eliminated but as lightly less pure crystal would be obtained. Also, the mother liquor can be recycled to the acidulation stage of the process.

Although the above-described invention has been described with a certain degree of particularity, it will be understood that numerous modifications and changes therein can be made and still be within the scope of the invention as claimed in the following claims.

What is claimed is:

1. A method for preparing ammonium phosphates comprising the steps of:
   (a) reacting, at temperatures of between about 120 and about 220° F., wet process phosphoric acid with a calcium-containing material that is substantially free of fluoride and sulfate ions and capable of providing calcium ions in amounts relative to the amounts of fluoride ions and sulfate ions contained in said phosphoric acid and said calcium-containing material sufficient to precipitate said fluorine and sulfate ions, said calcium-containing material being admixed in a proportion to form an acid liquid mixture in which calcium fluoride and calcium sulfate are formed;
   (b) ammoniating the resulting mixture at temperatures of between about 180 and about 260° F. to a pH of at least 4 to form insoluble compounds in the reaction mixture;
   (c) separating the insoluble compounds from the reaction mixture;
   (d) crystallizing a solid ammonium phosphate phase from the resulting liquor short of the liquor concentration where appreciable sulfate and fluoride ions are coprecipitated with said ammonium phosphate phase;
   (e) recovering said ammonium phosphate phase from said liquor; and
   (f) recycling the mother liquor from step (e) comprising fluoride ions and sulfate ions back to step (a).

2. A process according to claim 1 wherein from 0.01 to 0.5 mole of calcium ion is used per mole of phosphate ion.

3. A process according to claim 1 wherein from 0.5 to 2 moles of ammonium ion are used per mole of phosphate ion.

4. A process according to claim 1 wherein said calcium-containing material is phosphate rock.

5. A method of preparing ammonium phosphates comprising the steps of:
   (a) reacting, at temperatures of from about 120 to about 220° F., wet process phosphoric acid with (1) recycle mother liquor comprising fluoride ions and sulfate ions, and (2) a calcium-containing material that is substantially free of fluoride ions and sulfate ions and contains calcium ions in amount sufficient to precipitate the fluoride and sulfate ions contained in said reaction stage;
   (b) ammoniating, at temperatures of from about 180 to about 260° F., the resulting mixture to a pH of from about 4 to 7 to form insoluble compounds in the reaction mixture;
   (c) separating the insoluble compounds from the reaction mixture;
   (d) crystallizing a solid ammonium phosphate phase from the resulting liquor short of the liquor concentration where appreciable sulfate ions and fluoride ions are coprecipitated with the ammonium phosphate phase;
   (e) recovering said ammonium phosphate phase; and
   (f) recycling the mother liquor from the crystallization step of (d) back to the reaction step (a).

6. A process of producing pure ammonium phosphates which comprises:
   (a) reacting, at temperatures of from about 120 to about 220° F., finely divided phosphate rock with wet process phosphoric acid wherein from 0.01 to 0.5 mole of calcium is used per mole of phosphate to achieve a pH of −1 to 2;
   (b) 0.5 to 2 moles of ammonia are reacted with every mole of phosphate ion in the resultant reaction mixture until a pH of about 4 to about 7 is reached;
   (c) removing the insoluble material formed, crystallizing the remaining liquid to form a solid ammonium phosphate phase at a tempearture of from about 120 to 260° F. at a moisture loss rate of 2 to 8 moles of water per mole of phosphate ion per hour;
   (d) recovering said solid ammonium phosphate phase; and
   (e) recycling residual mother liquor at a rate of 0 to 1.0 volume of mother liquor per volume of phosphoric acid to the initial reaction step.

7. A process of preparing ammonium phosphates of high purity which comprises the steps of:

(a) reacting, at temperatures of from about 120 to about 220° F., wet process phosphoric acid with a calcium-containing material that is substantially free of fluoride ions and sulfate ions and capable of providing an amount of calcium ions sufficient to precipitate the fluoride ions and sulfate ions contained in said phosphoric acid and said material, said phosphoric acid and said calcium-containing material being admixed in a proportion to form an acid liquid mixture in which calcium fluoride and calcium sulfate are formed;

(b) separating the resulting calcium salt solids from said liquid mixture;

(c) ammoniating, at temperatures of from about 180 to about 260° F., said acid liquid from which said solids are separated to a pH of from about 4 to about 7 to form insoluble compounds of iron and aluminum while ammonium phosphate with sulfate and fluoride ions remain dissolved in the resulting liquor;

(d) separating the insoluble compounds from the liquor;

(e) crystallizing a solid ammonium phosphate phase from the liquor freed of said insoluble compounds short of a concentration of sulfate and fluoride ions where appreciable amounts of these ions are co-precipitated with the ammonium phosphate;

(f) recovering said ammonium phosphate phase; and (g) recycling residual mother liquor to the reaction step (a).

8. A process according to claim 7 wherein the reaction of said wet process phosphoric acid with said calcium-containing material is effected in the presence of recycle mother liquor comprising fluoride and sulfate ions.

References Cited

UNITED STATES PATENTS

| | | | |
|---|---|---|---|
| 1,876,011 | 9/1932 | Larsson | 23—107 |
| 1,879,204 | 9/1932 | Guillissen | 23—107 |
| 2,792,286 | 5/1957 | Wordie et al. | 23—107 |
| 2,799,569 | 7/1957 | Wordie et al. | 71—42 |
| 2,879,152 | 3/1959 | Coleman | 71—37 |
| 3,115,390 | 12/1963 | Jadot | 23—107 |
| 3,124,419 | 3/1964 | Germain et al. | 23—165 |

OTHER REFERENCES

Van Wazer Phosphorus And Its Compounds N.Y. Interscience 1961 volume 2, p. 1053.

OSCAR R. VERTIZ, *Primary Examiner.*

L. A. MARSH, O. F. CRUTCHFIELD,
*Assistant Examiners.*